United States Patent Office 3,462,273
Patented Aug. 19, 1969

3,462,273
2-DIOXOLANONES (CARBOXYLIC ACID ESTERS) PROTEIN HARDENERS
Francis Jeanne Sels, Kontich, Jozef Frans Willems, Wilrijk-Antwerp, and Marcel Nicolas Vrancken, Hove, Belgium, assignors to Gevaert-Agfa N.V., Mortsel, Belgium, a company of Belgium
No Drawing. Filed July 11, 1966, Ser. No. 564,037
Claims priority, application Great Britain, Oct. 8, 1965, 42,775/65
Int. Cl. G03c 1/30
U.S. Cl. 96—111    5 Claims The present invention relates to an improved method for hardening proteins or proteinaceous substances, more particularly gelatin, and especially for the hardening of photographic gelatin layers.

It is generally known to harden soluble or fusible macromolecular products after shaping which allows coupling the special properties of the starting materials with a lower solubility and a higher thermostability.

For instance when using gelatin in photographic emulsion layers, it is often necessary to harden the gelatin in order to render it more resistant to warm aqueous solutions with widely varying pH values. Indeed, an unhardened gelatin layer softens even at a temperature as low as 30° C. and then loses its firmness, whereas gelatin-containing emulsion layers in photographic materials have to be resistant to treatments at relatively high temperatures in successive baths, which vary widely in pH.

Where the starting materials are proteinaceous such as, e.g., gelatin, casein, zein, collagen, they may be hardened by treatment with metal salts or with organic compounds, whereby the finished material obtains a lower solubility, a lower water-absorption and a higher thermostability.

Of these metal salts may be mentioned, e.g., chromium, aluminium and zirconium salts.

As organic products known in this connection may be cited, e.g., aldehydes such as formaldehyde, acetaldehyde, acrolein, glyoxal and derivatives thereof; mixtures of an aliphatic aldehyde and an aromatic compound, the nucleus of which bears at least one hydroxyl group such as phenol, resorcinol and resorcyl aldehyde; compounds having two or more reactive groups which thus can cross-link the polypeptide chain, such as diketones, polyanhydrides, polyepoxides, compounds with one or more active halogen atoms, and compounds having at least two ethyleneimino groups (United Kingdom patent specification 918,950); reaction products of macromolecular compounds having amino and/or hydroxyl groups with some classes of unsaturated aliphatic compounds having carboxyl groups (United Kingdom patent specifications 822,061, 860,631 and 860,632); high-molecular weight polysaccharides having secondary alcohol groups oxidised to aldehyde groups (United Kingdom patent specification 891,221); and well-defined classes of sulphofluorides (Belgian patent specifications 571,228 and 571,229 and United Kingdom patent specification 909,378).

The hitherto known hardening agents, however, do not always give satisfactory results. The metal salts have the property of reacting very quickly, so that on adding the required quantity for obtaining the desired hardening, there is always the risk that the protein solution will coagulate before coating or shaping.

Hardening agents, such as formaldehyde, are partly volatized when the materials are dried, so that an accurate addition is very difficult to achieve.

Moreover, the known hardening agents other than metal salts generally act slowly, so that a long storage is necessary in order to attain a sufficiently stabilized state of hardening and/or they require an intense heating to reach the necessary degree of hardening, which, when using photographic silver halide emulsion layers, may give rise to a reduction in sensitivity and to fog formation.

It has now been found that a very good hardening of proteinaceous materials is obtained without the above disadvantages, by using as hardening agents 4-chloro-1,3-dioxolanone-2 or 4,5-dichloro-1,3-dioxolanone-2, which correspond to the following formulae:

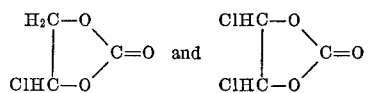

These compounds can also be named monochloroethylene carbonate and 1,2-dichloroethylene carbonate. They are obtained by chlorination of ethylene carbonate according to the method described in J. Am. Chem. Soc. 75 (1953), 1263.

As already stated the invention is particularly (although not exclusively) concerned with the hardening of proteinaceous layers in materials suitable for use in photographic reproduction processes. These materials are plural layer materials comprising a proteinaceous layer, usually a gelatin layer, coated on a support layer. The gelatin layer may be a light-sensitive layer, e.g., a gelatine silver halide emulsion layer, or a non light-sensitive layer, e.g., a gelatin image-receiving layer into which complexed silver halide can diffuse for forming an image according to the silver halide diffusion transfer process (see e.g. United Kingdom specifications Nos. 641,155, 654,630 and 654,631).

It is possible to obtain the required hardening by the addition of the specified hardening agents to solutions of proteins, without influencing the physical properties of the solutions before coating or during shaping.

For carrying out the method according to the present invention, 4-chloro-1,3-dioxolanone-2 and 4,5-dichloro-1,3-dioxolanone-2 can be added either to the protein solution, more particularly to a gelatin solution, or to a photographic gelatin emulsion before coating. They can also be incorporated by immersing the proteinaceous mass in a solution of one of these products.

After drying, the coated sheets, layers or articles are stored for some time in order to allow the hardening to take place. In many cases a storage time from 2 to 5 days suffices.

The pH of the mixture before coating or during storage influences the hardening reaction. Although the hardening is also possible at a low pH, advantage can be taken in the case of gelatin, of keeping the pH neutral or slightly alkaline in order to obtain a rapid and intense hardening.

The amount of hardening agent used may be varied within wide limits according to circumstances in individual cases (material to be hardened, degree of hardening required, drying method, pH, etc.).

For the hardening of gelatin layers in photographic materials by means of the compounds of the invention, an amount of 1 to 5% based on the weight of the dry gelatin generally suffices to obtain the desired effect.

According to the invention, gelatin layers are obtained, which have a good resistance to scratching and a swelling power markedly lower than usual. They possess, moreover, a markedly increased resistivity to mechanical damage and a higher softening point or melting point in aqueous solutions. This is of special importance for photographic emulsion layers and for other gelatin-containing auxiliary layers such as protective layers, antihalation layers, backing layers and filter layers, since the improvement of the physical properties permits a safe treatment of the photographic material in the different processing baths.

The following examples illustrate the present invention.

EXAMPLE 1

To 100 cc. of a 5% aqueous solution of gelatin 1 cc. is added of a 5% solution of 4-chloro-1,3-dioxolanone-2 in dimethylformamide. The pH of the resulting gelatin solution is adjusted to 7, whereupon this solution is poured onto glass plates, solidified and dried. After a drying period of 36 hr. at 50° C. the gelatin layers obtained do not dissolve anymore even in boiling water.

EXAMPLE 2

To 100 cc. of a 5% aqueous solution of gelatin 5 cc. are added of a 5% solution of 4,6-dichloro-1,3-dioxolanone-2 in dimethylformamide. The pH of the resulting gelatin solution is adjusted to 6.5, whereupon this solution is poured onto glass plates, solidified and dried. After a storage period of some days at room temperature, the gelatin layers resist a treatment with water of 80° C. for 10 minutes without losing their firmness.

EXAMPLE 3

To 1 kg. of a photographic contrasty gelatino silver halide emulsion containing 75 g. of gelatin are added 40 cc. of a 5% solution of 4-chloro-1,3-dioxolanone-2 in dimethylformamide. This emulsion is coated onto film, solidified, dried and then stored for some weeks at room temperature. The emulsion layer obtained in this way resists very well a treatment in successive baths of 50° C. having varying pH values. The emulsion layers do not dissolve anymore, even in boiling water.

What we claim is:

1. A method of hardening proteinaceous material in which this proteinaceous material is reacted with 4-chloro-1,3-dioxolanone-2 or 4,5-dichloro-1,3-dioxolanone-2 corresponding to the respective following formulae:

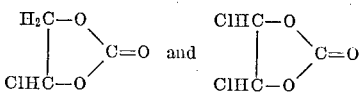

2. A method according to claim 1, wherein the said proteinaceous layer is a light-sensitive layer.

3. A method according to claim 2, wherein the proteinaceous layer is a gelatino silver halide emulsion layer.

4. In the manufacture of a plural layer material, which includes a gelatin layer and is suitable for use in a photographic reproduction process, the use of a method according to claim 1 for hardening the gelatin of such layer.

5. A plural layer material suitable for use in a photographic reproduction process and including a layer, which contains a proteinaceous material and a hardening agent corresponding to one of the following formulae:

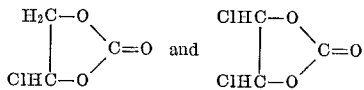

References Cited

UNITED STATES PATENTS 3,232,763  2/1966  Burness et al. _____ 96—111
3,338,715  8/1967  Burness et al. _____ 96—111

NORMAN G. TORCHIN, Primary Examiner

J. R. EVERETT, Assistant Examiner